(12) United States Patent
Fang (10) Patent No.: US 12,432,455 B2
(45) Date of Patent: Sep. 30, 2025

(54) VIDEO IMAGE DISPLAY METHOD AND APPARATUS

(71) Applicant: SUZHOU SUIWEN AI TECHNOLOGIES CO. LTD, Jiangsu (CN)

(72) Inventor: Zenghua Fang, Jiangsu (CN)

(73) Assignee: SUZHOU SUIWEN AI TECHNOLOGIES CO. LTD, Jiangsu (CN)

( * ) Notice: Subject to any disclaimer, the term of this patent is extended or adjusted under 35 U.S.C. 154(b) by 570 days.

(21) Appl. No.: 17/732,481

(22) PCT Filed: Oct. 29, 2019

(86) PCT No.: PCT/CN2019/114027
§ 371 (c)(1),
(2) Date: Apr. 28, 2022

(87) PCT Pub. No.: WO2021/081756
PCT Pub. Date: May 6, 2021

(65) Prior Publication Data
US 2023/0146794 A1    May 11, 2023

(51) Int. Cl.
*H04N 23/695* (2023.01)
*G06V 40/16* (2022.01)
*H04N 23/69* (2023.01)

(52) U.S. Cl.
CPC ......... *H04N 23/695* (2023.01); *G06V 40/161* (2022.01); *H04N 23/69* (2023.01)

(58) Field of Classification Search
None
See application file for complete search history.

(56) References Cited

U.S. PATENT DOCUMENTS

| 10,084,959 | B1 * | 9/2018 | Yu ........................... H04N 5/265 |
| 2010/0141772 | A1 | 6/2010 | Inaguma et al. |

FOREIGN PATENT DOCUMENTS

| CN | 103248824 A | * | 8/2013 |
| CN | 103327250 A | * | 9/2013 |

(Continued)

OTHER PUBLICATIONS

International Search Report from International Application No. PCT/CN2019/114027; published May 6, 2021.

*Primary Examiner* — James M Anderson, II
(74) *Attorney, Agent, or Firm* — Klarquist Sparkman, LLP (57) ABSTRACT

A video image display method and apparatus, comprising: obtaining a maximum field of view image obtained by a camera by photographing; detecting coordinates of all faces in a horizontal direction and a vertical direction in the maximum field of view image; calculating the minimum value and the maximum value of the coordinates of all the faces in the horizontal direction and the minimum value and the maximum value of the coordinates of all the faces in the vertical direction; on the basis of the minimum value and the maximum value of the coordinates of all the faces in the horizontal direction and the minimum value and the maximum value of the coordinates of all the faces in the vertical direction, adjusting the angle of view of the camera to enable all the persons photographed by the camera to be maximumly displayed on a video image output by the camera. The present application dynamically adjusts the angle of view of a camera on the basis of position detection of faces, and adaptively presents face display images, thereby improving a display effect of personnel video images in a video conference system.

6 Claims, 4 Drawing Sheets

(56) References Cited

FOREIGN PATENT DOCUMENTS

CN 106603912 A * 4/2017 ......... G06K 9/00718
EP 3096204 A1 11/2016

* cited by examiner

VIDEO IMAGE DISPLAY METHOD AND APPARATUS

CROSS-REFERENCE TO RELATED APPLICATIONS

This application is the national phase application under 35 U.S.C. § 371 claiming the benefit of priority based on International Patent Application No. PCT/CN2019/114027, filed on Oct. 29, 2019. The contents of each of these applications are hereby incorporated by reference in their entirety.

FIELD OF THE INVENTION

The present application relates to the technical field of video image processing, and in particular to a video image display method and apparatus.

BACKGROUND OF THE INVENTION

With the development of network technology and multimedia technology, the video conferencing systems have been increasingly widely used. The video conferencing systems use the communication network and multimedia terminal devices to realize a face-to-face remote instant conference between conferees in different places. Existing video conferencing systems usually use video conferencing cameras to capture video images of conferees and present them to the video conferencing display terminals through network transmission.

However, in the existing video conferencing systems, when a wide-angle camera is used, the field of view of the camera is fixed. When there are fewer conferees, the portraits displayed on a display frame are smaller, and when there are more conferees, it might not be possible to frame all persons in a display frame; while when a rotatable camera is used, the field of view needs to be adjusted manually by a remote control, and the angle cannot be adjusted by dynamically tracking human faces. These problems affect the effect of the video image display of persons in the video conferencing system.

SUMMARY OF THE INVENTION

The examples of the present application provide a video image display method and apparatus, which are used to solve the problem of the poor video image display of persons in the video conferencing system in the prior art.

In a first aspect, an example of the present application proposes a video image display method comprising the steps of:
  obtaining a maximum field of view image taken by a camera;
  detecting coordinates of all human faces in a horizontal direction and a vertical direction in the maximum field of view image;
  calculating the minimum value and the maximum value of the coordinates of all the human faces in the horizontal direction and the minimum value and the maximum value of the coordinates of all the human faces in the vertical direction;
  on the basis of the minimum value and the maximum value of the coordinates of all the human faces in the horizontal direction and the minimum value and the maximum value of the coordinates of all the human faces in the vertical direction, adjusting the field of view of the camera to enable all persons being shot by the camera to be maximumly displayed in video images output by the camera.

In some embodiments, the camera comprises a wide-angle camera; wherein said obtaining the maximum field of view image taken by the camera comprises obtaining a full-frame field of view image taken by the wide-angle camera.

In some embodiments, the method further comprises respectively setting the horizontal field of view and the vertical field of view of the wide-angle camera to a plurality of levels at predetermined intervals.

In some embodiments, said adjusting the field of view of the camera on the basis of the minimum value and the maximum value of the coordinates of all the human faces in the horizontal direction and the minimum value and the maximum value of the coordinates of all the human faces in the vertical direction comprises:
  adjusting the horizontal field of view level of the wide-angle camera according to the horizontal angle position in the full-frame field of view image corresponding to the minimum value and maximum value of the coordinates of all the human faces in the horizontal direction;
  adjusting the vertical field of view level of the wide-angle camera according to the vertical angle position in the full-frame field of view image corresponding to the minimum value and maximum value of the coordinates of all the human faces in the vertical direction.

In some embodiments, the method further comprises: tracking the position changes of the human faces in the video images output by the camera in real time, and dynamically adjusting the horizontal field of view level and the vertical field of view level.

In some embodiments, the camera comprises a rotatable camera; wherein said obtaining the maximum field of view image taken by the camera comprises obtaining the maximum field of view image attainable by said rotatable camera by the rotation of the lens in the horizontal and vertical directions.

In some embodiments, said adjusting the field of view of the camera on the basis of the minimum value and the maximum value of the coordinates of all the human faces in the horizontal direction and the minimum value and the maximum value of the coordinates of all the human faces in the vertical direction comprises: rotating the horizontal angle of the rotatable camera according to the horizontal field of view of the rotatable camera corresponding to the minimum value and maximum value of the coordinates of all the human faces in the horizontal direction; rotating the vertical angle of the rotatable camera according to the vertical field of view of the rotatable camera corresponding to the minimum value and maximum value of the coordinates of all the human faces in the vertical direction.

In some embodiments, the method further comprises: tracking the position changes of the human faces in the video images output by the camera in real time, and dynamically rotating the horizontal angle and vertical angle of the rotatable camera.

In some embodiments, the coordinates of all the human faces in the horizontal direction and the vertical direction comprise coordinates of at least two corner points of a detected human face rectangular frame.

In a second aspect, an example of the present application proposes a video image display apparatus comprising: an acquisition module configured to obtain a maximum field of view image taken by a camera; a detection module configured to detect coordinates of all human faces in a horizontal direction and a vertical direction in the maximum field of view image; a calculation module configured to calculate the minimum value and the maximum value of the coordinates of all the human faces in the horizontal direction and the minimum value and the maximum value of the coordinates of all the human faces in the vertical direction; an adjustment module configured to, on the basis of the minimum value and the maximum value of the coordinates of all the human faces in the horizontal direction and the minimum value and the maximum value of the coordinates of all the human faces in the vertical direction, adjust the field of view of the camera to enable all persons being shot by the camera to be maximumly displayed in video images output by the camera.

In some embodiments, the camera comprises a wide-angle camera; wherein the acquisition module is configured to obtain a full-frame field of view image taken by the wide-angle camera.

In some embodiments, the horizontal field of view and the vertical field of view of the wide-angle camera are respectively set to a plurality of levels at predetermined intervals.

In some embodiments, the adjustment module is further configured to: adjust the horizontal field of view level of the wide-angle camera according to the horizontal angle position in the full-frame field of view image corresponding to the minimum value and maximum value of the coordinates of all the human faces in the horizontal direction; adjust the vertical field of view level of the wide-angle camera according to the vertical angle position in the full-frame field of view image corresponding to the minimum value and maximum value of the coordinates of all the human faces in the vertical direction.

In some embodiments, the apparatus further comprises: a tracking module configured to track the position changes of the human faces in the video images output by the camera in real time, and dynamically adjust the horizontal field of view level and the vertical field of view level.

In some embodiments, the camera comprises a rotatable camera; wherein the acquisition module is configured to obtain the maximum field of view image attainable by said rotatable camera by the rotation of the lens in the horizontal and vertical directions.

In some embodiments, the adjustment module is further configured to: rotate the horizontal angle of the rotatable camera according to the horizontal field of view of the rotatable camera corresponding to the minimum value and maximum value of the coordinates of all the human faces in the horizontal direction; rotate the vertical angle of the rotatable camera according to the vertical field of view of the rotatable camera corresponding to the minimum value and maximum value of the coordinates of all the human faces in the vertical direction.

In some embodiments, the apparatus further comprises: a tracking module configured to track the position changes of the human faces in the video images output by the camera in real time, and dynamically rotate the horizontal angle and vertical angle of the rotatable camera.

In some embodiments, the coordinates of all the human faces in the horizontal direction and the vertical direction comprise coordinates of at least two corner points of a detected human face rectangular frame.

In a third aspect, a example of the present application further provide a computer readable storage medium having one or more computer programs stored thereon, the one or more computer programs are executed by a processor to implement the steps of the method described in the preceding embodiments.

Compared with the prior art, the examples of the present application adjust the field of view of the camera based on the human face position detection, adaptively present the human face display frame, realize the maximized human face framing, and improve the effect of video image display of persons in the video conferencing system.

BRIEF DESCRIPTION OF THE DRAWINGS

The present application will be understood more fully through the following detailed description and in conjunction with the accompanying drawings, in which similar elements are numbered in a similar manner, in which.

DETAILED DESCRIPTION OF THE EXAMPLES

The technical solutions of the present application will be clearly and completely described below through examples in conjunction with the drawings, but the present application is not limited to the examples described below. Based on the following examples, all other examples obtained by those of ordinary skill in the art without creative work shall fall within the protection scope of present application. For the sake of clarity, parts that are not related to the description of the exemplary embodiments are omitted in the drawings.

It should be understood that terms such as "comprising" or "having" in the present application are intended to indicate the existence of the features, numbers, steps, actions, components, or combinations thereof disclosed in the present specification, and do not exclude the possibility of the existence and addition of one or more other features, numbers, steps, actions, components or combinations thereof.

As mentioned above, the field of view of the camera in the existing video conferencing system is fixed or needs to be adjusted manually, which affects the effect of the video image display of persons in the video conferencing system. In order to solve these problems, the examples of the present application propose a video image display method and apparatus, which adaptively adjust the field of view (FOV, short for field of view) of the camera based on human face position detection, so as to achieve the optimal picture framing of the persons, thereby it is possible to improve the effect of the video image display of persons in the video conferencing system.

In the examples of the present application, the field of view is the range of shooting angles of the camera lens. For the camera lens, taking the lens as the vertex, the angle formed by the two edges of the maximum range in which the object image of the target being shot can pass through the lens can be called the field of view. Wherein the maximum angle range in which the lens can shoot in the horizontal direction can be called the horizontal field of view; and the maximum angle range in which the lens can shoot in the vertical direction can be called the vertical field of view.

It should be understood that the examples of the present application are not limited to the application scenario of the video conferencing system, and any application scenario that requires real-time video image display for persons can be applied to the technical solutions described in the examples of the present application.

Figure 1:
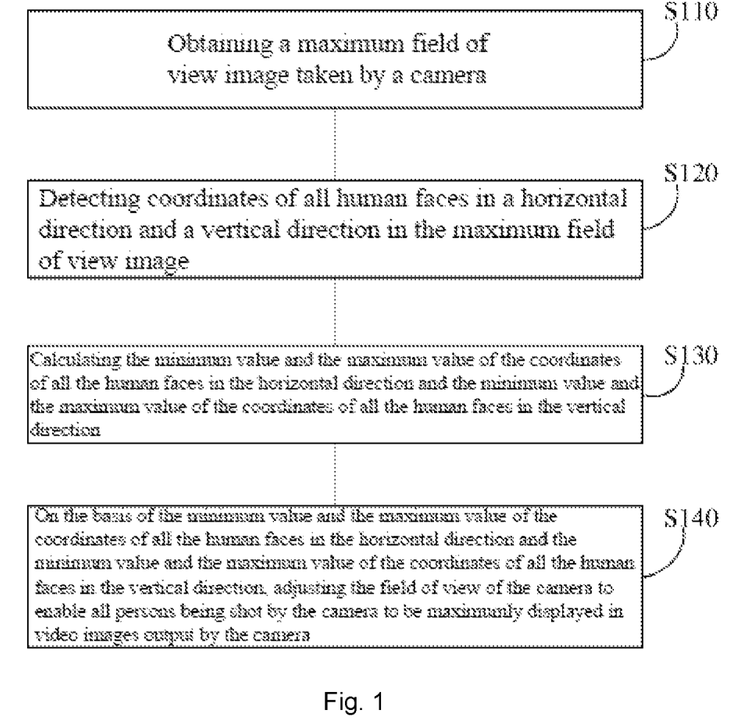
FIG. 1 is a schematic flowchart of a video image display method according to an example of the present application.

FIG. 1 is a schematic flowchart of a video image display method according to an example of the present application. As shown in FIG. 1, the video image display method of the example of the present application comprises the following steps: step S110, obtaining a maximum field of view image taken by a camera; step S120, detecting coordinates of all human faces in a horizontal direction and a vertical direction in the maximum field of view image; step S130, calculating the minimum value and the maximum value of the coordinates of all the human faces in the horizontal direction and the minimum value and the maximum value of the coordinates of all the human faces in the vertical direction; step S140, on the basis of the minimum value and the maximum value of the coordinates of all the human faces in the horizontal direction and the minimum value and the maximum value of the coordinates of all the human faces in the vertical direction, adjusting the field of view of the camera to enable all persons being shot by the camera to be maximumly displayed in video images output by the camera.

The example of the present application achieves the optimal display effect of the persons in the video image by obtaining the maximum field of view image taken by the camera, dynamically adjusting the field of view of the camera based on the detection of the coordinates of the human faces in the maximum field of view image, and adaptively presenting the display frame of the human faces.

In the example of the present application, the maximum field of view image taken by the camera in step S110 may be understood as a video image taken by the camera with the visual range of the maximum field of view.

In some embodiments, the camera used in step S110 may comprise a wide-angle camera or a rotatable camera. Wherein the wide-angle camera is a camera lens with a focal length shorter than a standard lens and a field of view larger than that of a standard lens. Generally, the larger the field of view of the wide-angle camera is, the larger the visual range is. The rotatable camera is a camera lens which can rotate a certain angle in different directions such as up, down, left, right direction and the like so as to shoot a target in different angle ranges.

When a wide-angle camera is used, the maximum field of view image taken by the wide-angle camera comprises a full-frame field of view image taken by the physical lens of the wide-angle camera. The term "full-frame" means that the area of the photosensitive element of the camera reaches a full-frame size of 36 mm*24 mm. The full-frame field of view image taken by the wide-angle camera is the full-frame image taken within the range of the maximum horizontal and vertical fields of view.

When a rotatable camera is used, the maximum field of view image taken by the rotatable camera comprises the maximum field of view image attainable by said rotatable camera by the rotation of the lens in the horizontal and vertical directions, that is, the image within the maximum visible range taken by the lens rotated to the maximum angle in the horizontal direction and the vertical direction respectively.

Figure 2:
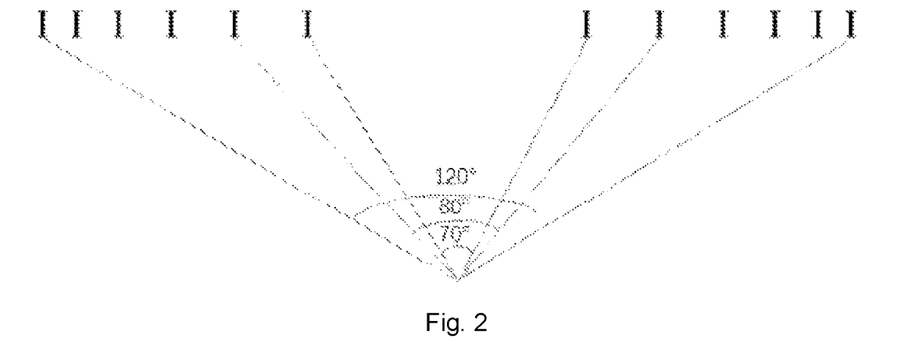
FIG. 2 is a schematic diagram of the horizontal field of view level setting of a wide-angle camera.
Figure 3:
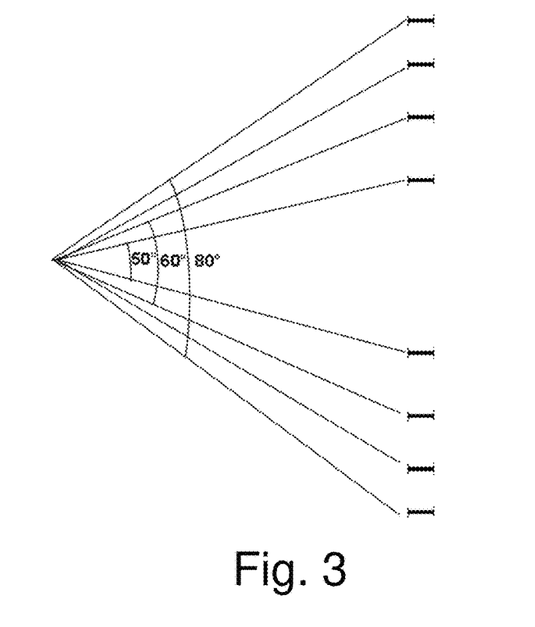
FIG. 3 is a schematic diagram of the vertical field of view level setting of a wide-angle camera.
Figure 4:
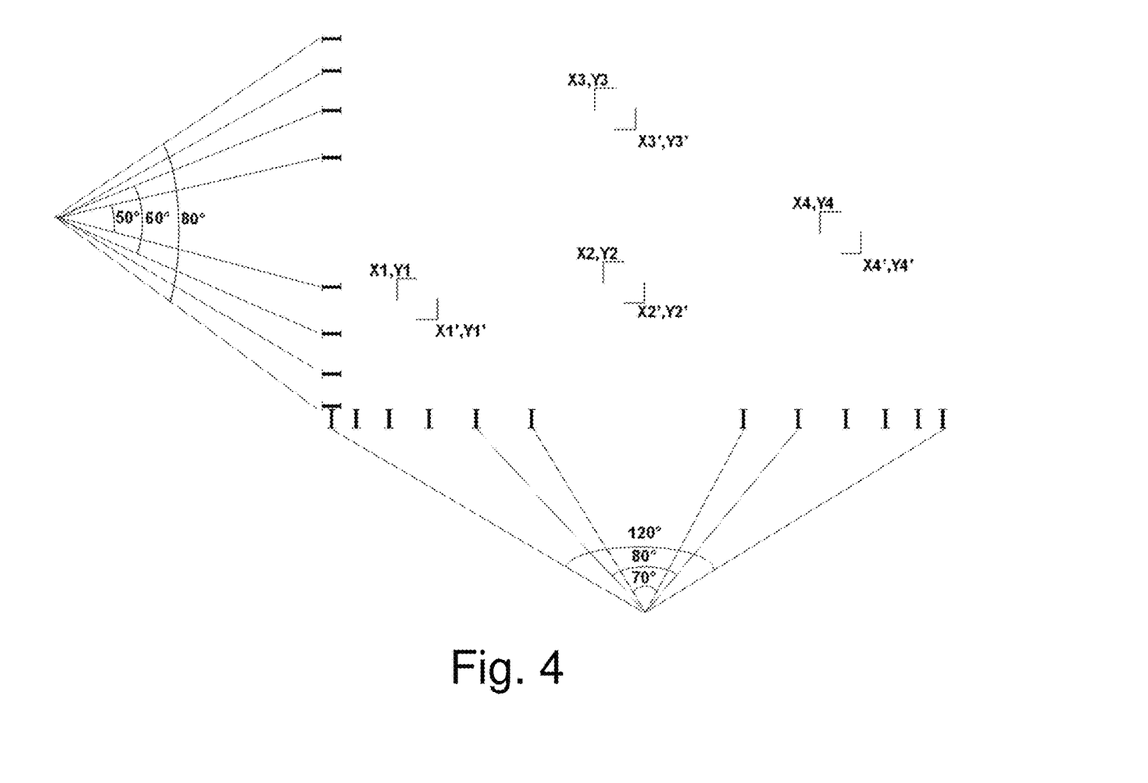
FIG. 4 is a schematic diagram of human face position detection based on a wide-angle camera.

FIGS. 2-4 exemplarily present an embodiment of dynamically adjusting the field of view based on a wide-angle camera. In the present embodiment, the horizontal field of view and the vertical field of view of the wide-angle camera may be respectively set to a plurality of levels at predetermined intervals. Subsequently, the maximum field of view image of the wide-angle camera is acquired; coordinates of all human faces in a horizontal direction and a vertical direction in the maximum field of view image are detected; the minimum value and the maximum value of the coordinates of all the human faces in the horizontal direction and the minimum value and the maximum value of the coordinates of all the human faces in the vertical direction are calculated; the horizontal field of view and the vertical field of view of the wide-angle camera are adjusted respectively to proper levels based on the minimum value and the maximum value of the coordinates of all the human faces in the horizontal direction and the minimum value and the maximum value of the coordinates of all the human faces in the vertical direction, to maximumly display the area with persons.

As shown in FIG. 2, as an example, in the present embodiment, the horizontal field of view of the wide-angle camera can be set to a plurality of levels by 10° intervals, such as 120°, 110°, 100°, 90°, 80°, 70°. Preferably, the horizontal field of view of the wide-angle camera is not less than 100°.

As shown in FIG. 3, as an example, in the present embodiment, the vertical field of view of the wide-angle camera can also be set to a plurality of levels by 10° intervals, such as 50°, 60°, 70°, and 80°. It should be understood that the level interval of the horizontal field of view and the vertical field of view of the wide-angle camera can be set to an appropriate angle according to the application scenario and the adjustment granularity, and is not limited to the 10° enumerated in the above example, and can also be other angles, such as 5°, 15°, 20°, etc.

As shown in FIG. 4, as an example, in the present embodiment, acquiring the full-frame field of view image (i.e., the maximum field of view image) of the wide-angle camera at a rate of 1 frame/sec, detecting the positions of all the human faces in the full-frame field of view image, and recording the coordinates (X, Y), (X', Y') of the upper left corner point and the lower right corner point of a human face rectangular frame. It should be understood that in some alternative embodiments, the coordinates of the lower left corner point and upper right corner point of the human face rectangular frame may also be recorded. In present embodiment, the factors that affect the number of the human faces that can be detected comprise light, human face angle, shielding, definition and the like.

Then, the minimum value Min(X1, X1', . . . , Xn, Xn') and the maximum value Max(X1, X1', . . . , Xn, Xn') of the coordinates of the human faces in the horizontal direction, and the minimum value Min(Y1, Y1', . . . , Yn, Yn') and the maximum value Max(Y1, Y1', . . . , Yn, Yn') of the coordinates of the human faces in the vertical direction are calculated.

After calculating out the minimum value and maximum value of the coordinates of the human faces in the horizontal direction, the horizontal angle position of the human faces in the full-frame field of view image of the wide-angle camera corresponding to the minimum value and the maximum value of the coordinates of the human faces in the horizontal direction can be determined, the minimum horizontal field of view level capable of framing all the human faces in a frame is calculated, and in turn the horizontal field of view of the wide-angle camera is adjusted to the minimum horizontal field of view level.

In some embodiments, at the minimum horizontal field of view level, the framing of the human face image can be symmetrical framing or asymmetrical framing, so that all the human faces are within the field of view range of the camera, and the margin of the video image taken is the minimum.

After calculating out the minimum value and maximum value of the coordinates of the human faces in the vertical direction, the vertical angle position of the human faces in the full-frame field of view image of the wide-angle camera corresponding to the minimum value and the maximum value of the coordinates of the human faces in the vertical direction can be determined, whereby the optimal vertical field of view level for framing the human faces can be determined, and in turn the vertical field of view of the wide-angle camera can be adjusted to the optimal vertical field of view level.

In some embodiments, at the optimal vertical field of view level, it can be ensured that the vertical field of view for framing comprises all the human faces, and a margin of ½ the height of the human faces is left up and down.

Through the above-mentioned way of adjusting the field of view, it is possible to enable all persons being shot by the wide-angle camera to be maximumly displayed in video images output by the camera, and to achieve the optimal framing effect of the personnel frame.

In some embodiments, it is also possible to track the position changes of the human faces in the current video image taken by the camera in real time, and to dynamically adjust the horizontal field of view level and the vertical field of view level of the wide-angle camera. As an example, the position changes of the human faces can be tracked in real time at a speed of 1 frame/sec. If the human faces move outside the current display frame and 3 consecutive frames are detected in which the human faces are outside all these frames, the horizontal field of view or vertical field of view is expanded to a wider level, to ensure that the human faces are displayed within the video frame; if the human faces converge towards the center of the frame and 3 consecutive frames are detected in which the human faces all enter a narrower horizontal or vertical field of view level, then the horizontal or vertical field of view is adjusted to a narrower level.

Figure 5:
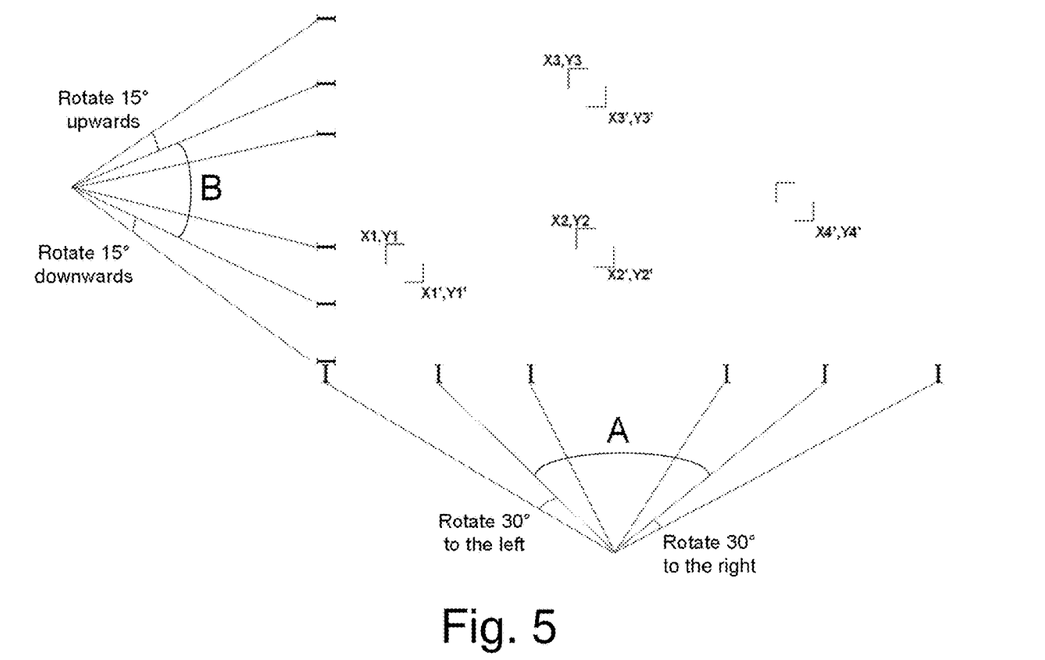
FIG. 5 is a schematic diagram of human face position detection based on a rotatable camera.

FIG. 5 presents an exemplary embodiment of dynamically adjusting the field of view based on a rotatable camera. In the present embodiment, the lens of the rotatable camera is rotated to the maximum left/right and up/down rotation angles, and an attainable field of view image (i.e., the maximum field of view image) is obtained; coordinates of all human faces in a horizontal direction and a vertical direction in the attainable field of view image are detected; the minimum value and the maximum value of the coordinates of all the human faces in the horizontal direction and the minimum value and the maximum value of the coordinates of all the human faces in the vertical direction are calculated; the horizontal angle and the vertical angle of the rotatable camera are adjusted respectively to proper angles based on the minimum value and the maximum value of the coordinates of all the human faces in the horizontal direction and the minimum value and the maximum value of the coordinates of all the human faces in the vertical direction, to maximumly display the area with persons.

As shown in FIG. 5, as an example, the horizontal field of view A of the rotatable camera can be rotated 30° to the left and 30° to the right, and the vertical field of view B thereof can be rotated 15° upwards and 15° downwards. It should be understood that, in the present embodiment, the left-right rotatable angle range of the horizontal field of view A and the up-down rotatable angle range of the vertical field of view B of the rotatable camera can be set to appropriate angles according to the application scenario and shooting range, and are not limited to the specific angles enumerated in the above example, and the left-right rotatable angle range of the horizontal field of view A and the up-down rotatable angle range of the vertical field of view B of the rotatable camera may be the same or different.

As an example, in the present embodiment, detecting the positions of all the human faces in the attainable field of view image, recording the coordinates (X, Y), (X', Y') of the upper left corner point and the lower right corner point of a human face rectangular frame, and mapping the coordinates of the human face to the virtual space of the attainable field of view image. It should be understood that in some alternative embodiments, the coordinates of the lower left corner point and upper right corner point of the human face rectangular frame may also be recorded.

Then, the minimum value $Min(X1, X1', \ldots, Xn, Xn')$ and the maximum value $Max(X1, X1', \ldots, Xn, Xn')$ of the coordinates of the human faces in the horizontal direction, and the minimum value $Min(Y1, Y1', Yn, Yn')$ and the maximum value $Max(Y1, Y1', \ldots, Yn, Yn')$ of the coordinates of the human faces in the vertical direction are calculated.

After calculating out the minimum value and maximum value of the coordinates of the human faces in the horizontal direction, the horizontal field of view of the rotatable camera corresponding to the minimum value and the maximum value of the coordinates of the human faces in the horizontal direction can be determined, the horizontal field of view capable of framing all the human faces in a frame is calculated, and in turn the horizontal angle of the rotatable camera is rotated to realize the framing of all the human faces.

In some embodiments, if the minimum value and maximum value of the coordinates of the human faces in the horizontal direction exceed the horizontal field of view of the rotatable camera, the side with fewer faces can be discarded according to a preset rule, or the centered position can be chosen so that both sides have the same number of faces, thus ensuring most faces are in the field of view.

After calculating out the minimum value and maximum value of the coordinates of the human faces in the vertical direction, the vertical field of view of the rotatable camera corresponding to the minimum value and maximum value of the coordinates of the human faces in the vertical direction can be determined, the vertical field of view capable of framing all the human faces in a frame is calculated, and in turn the vertical angle of the rotatable camera is rotated to realize the framing of all the human faces.

Through the above-mentioned way of adjusting the field of view, it is possible to enable all persons being shot by the rotatable camera to be maximumly displayed in video images output by the camera, and to achieve the optimal framing effect of the personnel frame.

In some embodiments, it is also possible to track the position changes of the human faces in the current video image taken by the camera in real time, and to dynamically adjust the horizontal angle and the vertical angle of the rotatable camera. In an optional embodiment, it is possible to predict the direction of the human face moving out of the frame by using a multi-frame tracking technology, and to rotate the camera to track person moving in the conference. As an example, the position changes of the human faces can be tracked in real time at a speed of 1 frame/sec. If the human faces move outside the current display frame and 3 consecutive frames are detected in which the human faces are outside all these frames, and there is no human face at the edges of the frames in the opposite direction, then the lens is rotated to the direction of the human face moving out of the frame, so that the human faces are framed to be displayed again.

Figure 6:
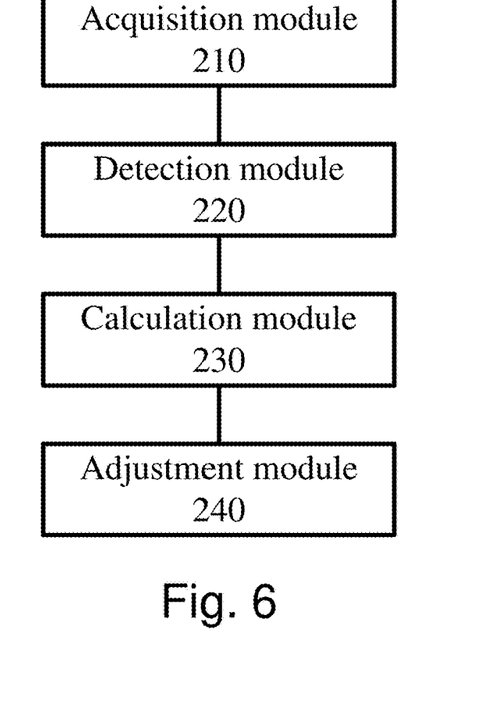
FIG. 6 is a structural example diagram of a video image display apparatus according to an example of the present application.

FIG. 6 is a schematic structural diagram of a video image display apparatus according to an example of the present application. As shown in FIG. 6, the video image display apparatus of the example of the present application comprises the following modules: an acquisition module 210 configured to obtain a maximum field of view image taken by a camera; a detection module 220 configured to detect coordinates of all human faces in a horizontal direction and a vertical direction in the maximum field of view image; a calculation module 230 configured to calculate the minimum value and the maximum value of the coordinates of all the human faces in the horizontal direction and the minimum value and the maximum value of the coordinates of all the human faces in the vertical direction; an adjustment module 240 configured to, on the basis of the minimum value and the maximum value of the coordinates of all the human faces in the horizontal direction and the minimum value and the maximum value of the coordinates of all the human faces in the vertical direction, adjust the field of view of the camera to enable all persons being shot by the camera to be maximumly displayed in video images output by the camera.

In some embodiments, the camera may comprise a wide-angle camera, and the acquisition module 210 is further configured to obtain a maximum field of view image taken by the wide-angle camera. The maximum field of view image taken by the wide-angle camera comprises a full-frame field of view image taken by the physical lens of the wide-angle camera.

In some embodiments, when a wide-angle camera is used, the horizontal field of view and the vertical field of view of the wide-angle camera are respectively set to a plurality of levels at predetermined intervals. The examples of the level setting of the horizontal field of view and the vertical field of view of the wide-angle camera can refer to what is shown in FIGS. 2 and 3, and will not be repeated here.

In some embodiments, the adjustment module 240 is further configured to: adjust the horizontal field of view level of the wide-angle camera according to the horizontal angle position of the minimum value and maximum value of the coordinates of all the human faces in the horizontal direction in the full-frame field of view image; adjust the vertical field of view level of the wide-angle camera according to the vertical angle position of the minimum value and maximum value of the coordinates of all the human faces in the vertical direction in the full-frame field of view image.

Figure 7:
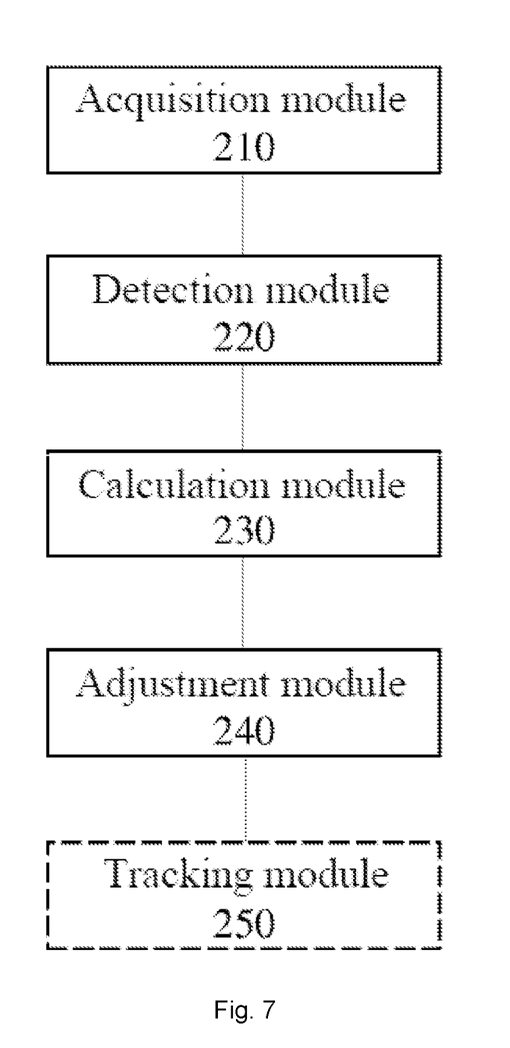
FIG. 7 is a structural example diagram of a video image display apparatus according to another example of the present application.

In some embodiments, as shown in FIG. 7, the apparatus may further comprise a tracking module 250 configured to track the position changes of the human faces in the current video image taken by the camera in real-time, and dynamically adjust the horizontal field of view level and the vertical field of view level. As an example, the tracking module 250 can track the position changes of the human faces in real time at a rate of 1 frame/sec. If the human faces move outside the current display frame and 3 consecutive frames are detected in which the human faces are outside all these frames, the horizontal field of view or vertical field of view is expanded to a wider level, to ensure that the human faces are displayed within the video frame; if the human faces converge towards the center of the frame and 3 consecutive frames are detected in which the human faces all enter a narrower horizontal or vertical field of view level, then the horizontal or vertical field of view is adjusted to a narrower level.

In some embodiments, the camera may comprise a rotatable camera. The acquisition module 210 is also configured to obtain the maximum field of view image taken by the rotatable camera. The maximum field of view image taken by the rotatable camera comprises the maximum field of view image attainable by said rotatable camera by the rotation of the lens in the horizontal and vertical directions.

In some embodiments, the adjustment module 240 is further configured to: rotate the horizontal angle of the rotatable camera according to the horizontal field of view of the rotatable camera corresponding to the minimum value and maximum value of the coordinates of all the human faces in the horizontal direction; rotate the vertical angle of the rotatable camera according to the vertical field of view of the rotatable camera corresponding to the minimum value and maximum value of the coordinates of all the human faces in the vertical direction.

In some embodiments, the tracking module 250 may also be configured to track the position changes of the human faces in the video image output by the camera in real time, and dynamically rotate the horizontal angle and vertical angle of the rotatable camera. In an optional embodiment, the tracking module 250 can predict the direction of the human face moving out of the frame by means of a multi-frame tracking technology, and rotate the camera to track person moving in the conference. As an example, the tracking module 250 can track the position changes of the human faces in real time at a speed of 1 frame/sec. If the human faces move outside the current display frame and 3 consecutive frames are detected in which the human faces are outside these frames, and there is no human face at the edges of the frames in the opposite direction, then the lens is rotated to the direction of the human face moving out of the frame, so that the human faces are framed to be displayed again.

In some embodiments, coordinates of all the human faces in the horizontal direction and the vertical direction comprise coordinates of at least two corner points of a detected human face rectangular frame. Examples of detecting the coordinates of the human faces in the horizontal direction and the vertical direction can refer to FIGS. 4 and 5, and will not be repeated here.

The steps, units, or modules involved in the examples of the present application can be implemented by software, hardware, or a combination thereof. The described steps, units, or modules can also be implemented in a camera device or computing device, wherein the name of the unit or module does not constitute a limitation on the unit or module itself. The camera device or computing device usually comprises a processor for executing a program, and a memory for storing the program, wherein the program can implement the method steps described in the present application when the program is loaded into the processor and run.

The method described in the examples of the present application can be implemented as a computer software program. For example, an example of the present application may comprise a computer program product comprising a readable storage medium having one or more computer programs stored thereon which comprises program code for executing the method described in the present application. On the other hand, an examples of the present application may also comprise a computer-readable storage medium having one or more programs stored thereon which, when executed by one or more processors, can implement the method steps described in the present application.

The embodiments of the application are not limited to what is described in the above-mentioned examples. Without departing from the spirit and scope of the present application, those of ordinary skill in the art can make various changes and improvements as to the form and details of the application, all of which are considered to fall into the scope of protection of the present application.

What is claimed is:

1. A video image display method, comprising the steps of:
   obtaining a maximum field of view image taken by camera;
   detecting coordinates of all human faces in a horizontal direction and a vertical direction in the maximum field of view image;
   calculating the minimum value and the maximum value of the coordinates of all the human faces in the horizontal direction and the minimum value and the maximum value of the coordinates of all the human faces in the vertical direction; and
   on the basis of the minimum value and the maximum value of the coordinates of all the human faces in the horizontal direction and the minimum value and the maximum value of the coordinates of all the human faces in the vertical direction, adjusting the field of view of the camera to enable all human faces being shot by the camera to be displayed as large as possible while keeping all human faces within video images output by the camera;
   characterized in that:
      the camera comprises a wide-angle camera, wherein said obtaining the maximum field of view image taken by the camera comprises obtaining a full-frame field of view image taken by the wide-angle camera, and wherein the method further comprises respectively setting the horizontal field of view and the vertical field of view of the wide-angle camera to a plurality of levels at predetermined intervals; and
      said adjusting the field of view of the camera on the basis of the minimum value and the maximum value of the coordinates of all the human faces in the horizontal direction and the minimum value and the maximum value of the coordinates of all the human faces in the vertical direction comprises:
         adjusting the horizontal field of view level of the wide-angle camera according to a horizontal angle position in the full-frame field of view image corresponding to the minimum value and maximum value of the coordinates of all the human faces in the horizontal direction, and
         adjusting the vertical field of view level of the wide-angle camera according to a vertical angle position in the full-frame field of view image corresponding to the minimum value and maximum value of the coordinates of all the human faces in the vertical direction.

2. The video image display method according to claim 1, characterized in that the method further comprises: tracking the position changes of the human faces in the video images output by the camera in real time, and dynamically adjusting the horizontal field of view level and the vertical field of view level.

3. The video image display method according to claim 1, characterized in that the coordinates of all the human faces in the horizontal direction and the vertical direction comprise coordinates of at least two corner points of a detected human face rectangular frame.

4. A computing device, comprising:
   a processor for executing a program, and
   a memory for storing the program, wherein when the program is loaded into the processor, the processor implements the operations of:
   obtaining a maximum field of view image taken by a camera;
   detecting coordinates of all human faces in a horizontal direction and a vertical direction in the maximum field of view image;
   calculating the minimum value and the maximum value of the coordinates of all the human faces in the horizontal direction and the minimum value and the maximum value of the coordinates of all the human faces in the vertical direction; and
   on the basis of the minimum value and the maximum value of the coordinates of all the human faces in the horizontal direction and the minimum value and the maximum value of the coordinates of all the human faces in the vertical direction, adjusting the field of view of the camera to enable all human faces being shot by the camera to be displayed as large as possible while keeping all human faces within video images output by the camera;
   characterized in that:
      the camera comprises a wide-angle camera, wherein the operation of obtaining comprises obtaining a full-frame field of view image taken by the wide-angle camera, and wherein the horizontal field of view and the vertical field of view of the wide-angle camera are respectively set to a plurality of levels at predetermined intervals; and
      the operation of adjusting further comprises:
         adjusting the horizontal field of view level of the wide-angle camera according to a horizontal angle position in the full-frame field of view image corresponding to the minimum value and maximum value of the coordinates of all the human faces in the horizontal direction, and
         adjusting the vertical field of view level of the wide-angle camera according to a vertical angle position in the full-frame field of view image corresponding to the minimum value and maximum value of the coordinates of all the human faces in the vertical direction.

5. The computing device according to claim 4, characterized in that when the program is loaded into the processor, the processor further implements the operation of: tracking the position changes of the human faces in the video images output by the camera in real time, and dynamically adjusting the horizontal field of view level and the vertical field of view level.

6. The computing device according to claim 4, characterized in that the coordinates of all the human faces in the horizontal direction and the vertical direction comprise coordinates of at least two corner points of a detected human face rectangular frame.

* * * * *